United States Patent [19]
Dulany

[11] Patent Number: 5,256,308
[45] Date of Patent: Oct. 26, 1993

[54] METHOD FOR THE CURE AND REMOVAL OF OVERSPRAY PAINT FROM THE WATER WASH SYSTEM OF PAINT SPRAY BOOTHS

[75] Inventor: Michael T. Dulany, Souderton, Pa.

[73] Assignee: Betz Laboratories, Inc., Trevose, Pa.

[21] Appl. No.: 932,162

[22] Filed: Aug. 19, 1992

[51] Int. Cl.⁵ ............................ C02F 1/02; C02F 1/30
[52] U.S. Cl. .................... 210/712; 210/737; 210/748; 210/930; 134/38
[58] Field of Search ............... 210/702, 710, 721, 712, 210/725, 727, 728, 729, 737, 930, 748, 763, 770; 55/85; 134/38

[56] References Cited

U.S. PATENT DOCUMENTS

| | | | |
|---|---|---|---|
| 2,978,344 | 4/1961 | Parker et al. | 210/737 |
| 4,661,262 | 4/1987 | Cost | 210/930 |
| 5,068,040 | 11/1991 | Jackson | 210/748 |

FOREIGN PATENT DOCUMENTS

| | | | |
|---|---|---|---|
| 58-6209 | 1/1983 | Japan | 210/930 |
| 2222095 | 8/1988 | United Kingdom | 210/748 |

*Primary Examiner*—Peter Hruskoci
*Attorney, Agent, or Firm*—Alexander D. Ricci; Gregory M. Hill

[57] ABSTRACT

A method for treating paint a paint spray booth water wash system comprising collecting overspray paint into a sump, adding a stabilizing compound to the water in the sump, adding a paint cure catalyst to accelerate the cure of the paint, assisted by heat, and then filtering the cured paint from the clean water filtrate. Alternatively, instead of a heat/catalyst system, a photoinitiator coupled with electron beam, microwave or ultraviolet energy sources may be used.

5 Claims, 1 Drawing Sheet

METHOD FOR THE CURE AND REMOVAL OF OVERSPRAY PAINT FROM THE WATER WASH SYSTEM OF PAINT SPRAY BOOTHS

FIELD OF THE INVENTION

The Present invention relates to industrial paint spray booths and specifically to the inhibition of the adverse effects caused by overspray paint captured by the water in these booths.

BACKGROUND OF THE INVENTION

In most conventional paint spray booth systems, a portion of the projected paint fails to contact the intended substrate. This portion, known as "overspray paint" must be captured in the painting area to prevent discharge into the environment or fouling of the facility and equipment. The preferred capture medium in most commercial painting facilities is water. After overspray paint is captured by the water of a waterwall or downdraft booth, it must then be treated to prevent system fouling and facilitate removal from the water and disposal.

Current paint detackification technology detackifies overspray paint by physical absorption or chemical neutralization. This neutralizes captured overspray paint by isolating the paint particles and preventing them from reacting with the surroundings or each other.

Conventional treatment programs for the detackification of overspray paint solids involves the generation of a considerable volume of waste product which requires special apparatus for removal and handling. The volume of the product (usually sludges) generated by the methods of prior art usually exceed the total volume of overspray paint plus treatment chemicals due to the absorption of water.

GENERAL DESCRIPTION OF THE INVENTION

This invention comprises a method of generating a dry product of exceedingly low volume which dewaters completely without the addition of the dewatering chemicals or elaborate apparatus as required in the previous art. Furthermore, because the final product of this method is a dry and brittle solid, it can be easily filtered from the water system and transported without the hazards or mess associated with conventional sludges. This invention also reduces the area required for paint waste handling at the user's facility.

Rather than deactivating the paint by neutralization or isolation of its components, this process detackifies the suspended paint solids by driving the paint components to react and polymerize under controlled conditions. By curing the paint in solution, this treatment takes advantage of the crosslinking mechanism that the paint was originally formulated to undergo. Furthermore, this reaction produces a water-free, ultra low-volume product which is much easier to handle and dispose of than current high volume sludges.

DETAILED DESCRIPTION OF THE INVENTION

Figure 1:
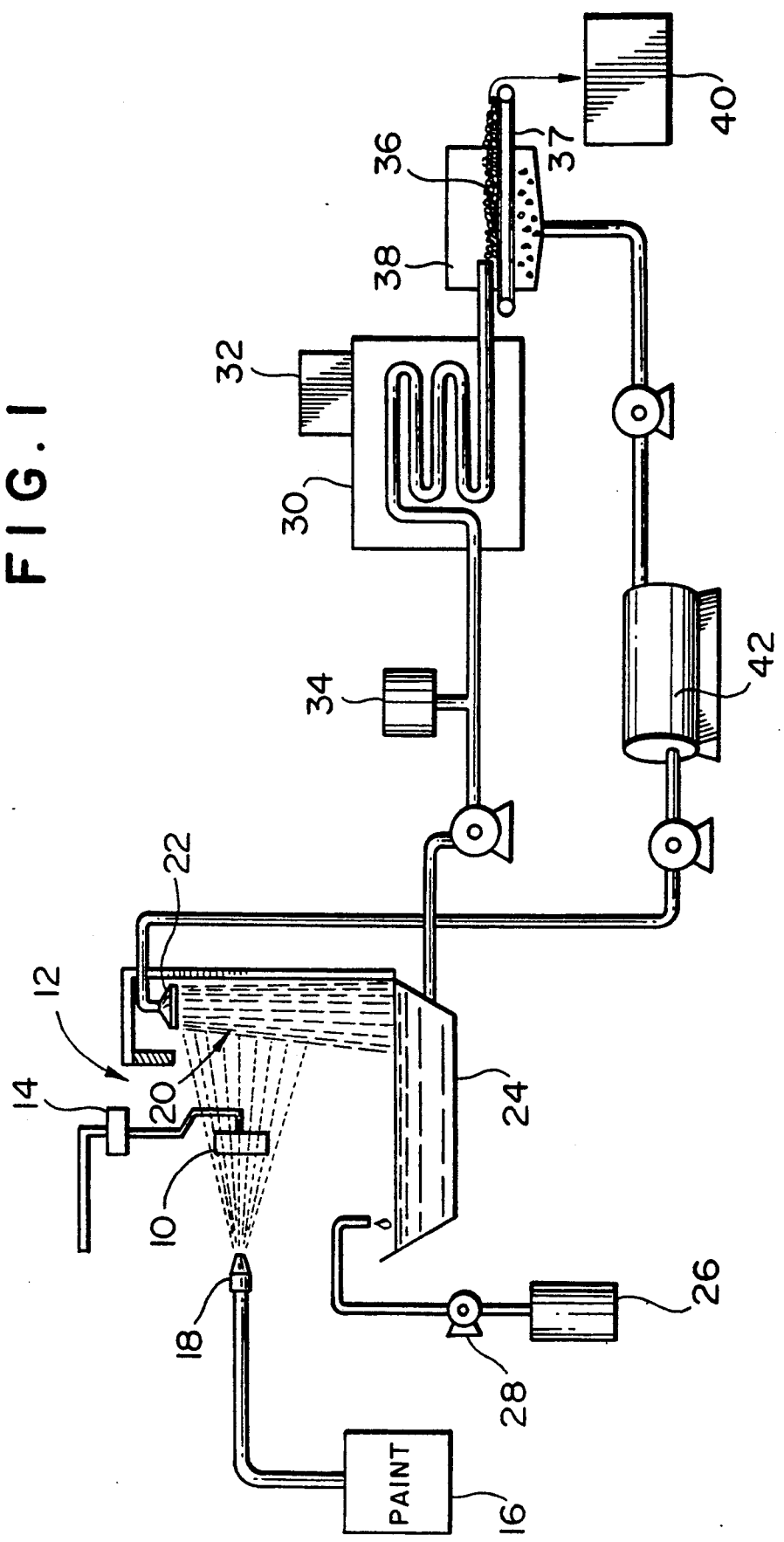
FIG. 1 is a schematic of a paint spray booth system according to the method of the present invention.

Conventional paint spray booth water systems are generally recirculating. The water that collects overspray paint in the spray booth is first treated to detackify and/or agglomerate the overspray paint particles. The water is then filtered or otherwise processed to facilitate the removal of the detackified/agglomerated paint particles. The water thus treated is then available for recirculation back to the spray booth to be used for the collection of more overspray paint.

Turning to FIG. 1, what is shown is a schematic representation of a complete paint spray booth recirculating water wash system according to the present invention. Work pieces 10, which may range from very small components to appliances to large pieces such as automobile bodies, are carried into the spray booth 12 by a conveyor means 14. Represented herein is an overhead conveyer. However, other means such as a belt-like conveyor which support work pieces from below are acceptable. Also, the spray booth may not utilize a mechanical conveyor at all and could function by manual placement/removal of individual work pieces.

Paint is pumped from a container 16 and is forced through a paint nozzle 18 toward the workpiece to be painted. The paint forced through the paint nozzle 18 is atomized into a fine spray which covers the targeted workpiece 10. The atomized paint which fails to contact the workpiece 10, commonly called "overspray paint", reaches a water wall 20, which is created by spraying water through a nozzle means 22 toward a water reservoir or sump 24. The overspray paint is collected by water wall 20 and accumulates in sump 24.

This invention will work equally as well with water based paints, oil based paints or the blends thereof which result from mixing into a common sump or reservoir oversprays from multiple spray booths using different paints. In accordance with this invention, it is necessary to first stabilize the overspray paint in the sump. This is achieved by adding to the sump a sufficient amount of a stabilizing compound. For oil based paints, stabilization means rendering the overspray paint non-tacky. Satisfactory stabilizing compounds for oil based paints include conventional surfactants, emulsifiers, solution polymerization stabilizers, colloidal oils and polyelectrolytes. Water based paints will readily disperse in the water, naturally. However, stabilizers such as surfactants or polyelectrolytes may be necessary to enhance inherent stabilizing properties.

The selection of the stabilizing compound depends on factors such as the degree of paint atomization, water system design and turbulence of the water. The stabilizing compound may be added to the water in the sump 24 from a container 26 metered by pump means 28. Feed of the compound may be either intermittent or continuous.

The stabilized overspray paint is then pumped from the sump 24 to a curing chamber 30. The curing chamber may contain a coiled or serpentine conduit configuration, as shown in FIG. 1, for the purpose of increasing the residence time of the water in the curing chamber. The purpose of the curing chamber 30 is to facilitate the complete cure of the stabilized paint particles in the water.

Various means may be utilized to provide an energy source 32 to facilitate paint cure. Thermal curing is brought about by means of a heat generating source. Gas or electric heaters may be utilized or waste heat from other locations of the industrial facility may be collected and distributed to the curing chamber.

An alternative design for energy source 32 is to utilize clear conduit in the curing chamber and electron beam, microwave or ultraviolet generating means to provide the necessary energy to facilitate the curing process.

When thermal curing means are selected, catalysts are necessary. Paint cure catalysts promote the cure of paint applied to target substrates at various temperatures. Paint catalysts are well known in the art and include substituted sulfonic acids, acid phosphate esters or salts thereof, morpholine, magnesium hexafluorsilicate, phosphoric acid and acetic acid. Examples of the substituted sulfonic acids are paratoluene sulfonic acid, sulfonic acid, dodecylbenzene sulfonic acid, trifluoromethane sulfonic acid, methane sulfonic acid and naphthalene sulfonic acid. Characteristic examples of the acid phosphate esters are phenyl acid phosphate, butyl acid phosphate and ethyl acid phosphate.

It has been discovered that the particles of overspray paint in the water will rapidly cure when a catalyst is added to the water and sufficient thermal energy is provided to the paint laden water in the curing chamber so as to cure the overspray paint. An appropriate balance of catalyst, catalyst concentration, temperature and cure time must be determined. For example, a slow acting catalyst or a low catalyst concentration would require a larger thermal input than would a rapid acting catalyst or a high catalyst concentration. Generally, catalyst concentrations of from 10 to 1000 ppm may be utilized. More suitable catalyst concentrations are in the range of 50 to 500 ppm.

When curing techniques by means such as electron beam, microwave or ultraviolet energy sources are chosen, photoinitiators are required. These compounds include sulfonic salts, such as arylsulfonium salt, and substituted acetophenones. Representative examples of the substituted acetophenones are the alkyl ethers of benzoin, $\alpha,\alpha$-dimethoxy-$\alpha$-phenylacetophenone, $\alpha,\alpha$-diethoxyacetophenone and benzophenone. As with the catalyst, photoinitiator concentrations of from 10 to 1000 ppm may be employed. More suitable concentrations would be in the range of 50 to 500 ppm.

Depending on the cure system used, the catalyst or photoinitiator is delivered to the paint laden water before it enters the curing chamber 30 via a delivery means 34, such as a variable rate dropper or metering pump. Although the catalyst or photoinitiator may be delivered to the water intermittently, it is preferable to deliver it continuously due to the continuous flow of water through the water wash system and a desire to maintain a uniform rate of cure of the overspray paint.

The water leaving the cure chamber will contain small, pellet or flake shaped cured paint particles 36. The cure chamber effluent is sent to a filtering chamber 38 to separate the cured paint particles 36 from the water. The cured paint particles 36 are mechanically removed from the filtering chamber 38 by means such as a conveyor and placed in a waste bin 40 for subsequent transport to a suitable waste collection or treatment facility. The waste generated by this process is substantially free of water. This results in significantly lower disposal and transport costs and eliminates the need for additional treatment to dewater the sludge before disposal.

The water discharged from the filtering chamber 38 is now free of paint particles. It is then sent to a holding tank 42 to await reuse in the water well 20 of the spray booth 12 to collect additional overspray paint.

In treating spray booth systems where oil based paints are utilized, the overspray paint may contain volatile solvents. Upon curing the overspray paint according to the method of the present invention, those volatile solvents are released. The volatile solvents may be collected by any number of conventional solvent recovery means. The recovered solvents may then be properly disposed of or they may be used as fuel for furnaces, boilers, etc., elsewhere in the industrial facility.

Example

The utility of the treatment method of the present invention is demonstrated by a laboratory beaker test. A 500 ml beaker was charged with 400 ml of tap water and 0.3cc of a stabilizing surfactant, Surfonic N-95 (Texaco). The clear solution was agitated with a stir bar as 1cc of a typical high solids automotive enamel was added dropwise. The paint sample, a burgundy base coat produced by PPG Industries, was suspended in solution in droplets by the surfactant and the agitation.

Heat was added to the agitated solution until the initial temperature of 20 degrees Celsius was raised to 60 degrees. The cloud point of the surfactant was passed in this range and the solution became opaque. At 60 degrees C, 0.2cc (50 ppm) of dodecylbenzene sulfonic acid (DDBSA) as the paint cure catalyst was slowly added and the water cleared.

A wooden coupon was immersed into the solution. Suspended paint droplets quickly deposited onto the coupon and smeared readily under shear after the coupon was removed. Ten minutes later, another coupon was inserted into the bath. This time the paint did not deposit readily but had to be physically trapped and removed. The droplets were dry to the touch but would smear under shear. The temperature of the bath was allowed to rise to 80 degrees C.

At twenty minutes, the bath temperature was still 80 degrees C and the droplets had to be trapped and removed as before. This time, however, the paint drops would not smear under shear. This indicated that the reaction was complete. The paint had cured.

The bath was removed and gravity filtered through filter paper. The dry, brittle paint particles dewatered readily from the clear filtrate solution.

The critical interaction between the stabilization of the overspray paint particles, the concentration of the paint cure catalyst and the cure temperature/time variable is demonstrated below.

A 500 ml beaker was charged with 400 ml of tap water and a surfactant made up of 0.25% polyvinyl alcohol and 12.5 ppm of Surfonic N-95. The clear solution was agitated as 1 cc of a high solids burgundy base cost, from PPG, was added dropwise. The surfactant suspended the paint droplets in solution.

Heat was added to the solution until the temperature reached 50° C. At this point 0.2 cc (50ppm) of DDBSA was slowly added. The temperature of the ample was slowly increased to 90° C. and clean wooden coupons were periodically inserted to monitor the performance of the catalyst. The results are as follows:

| Time(Minutes) | Temperature | Comments |
| --- | --- | --- |
| — | 50° C. | paint deposited on coupons and smeared under shear |
| 5 | 70° C. | same as above |
| 10 | 80° C. | Paint beginning to agglomerate |

-continued

| Time(Minutes) | Temperature | Comments |
| --- | --- | --- |
| 15 | 80° C. | No depostion on coupon, paint still smears |
| 25 | 90° C. | paint cured |

The above examples are intended to show the utility of the present invention. They are not intended to limit the scope of the disclosed method of treating paint spray booth water systems by curing the overspray paint in the water.

What I claim is:

1. A method for treating overspray paint in the water of a paint spray booth water wash system comprising adding to the water from about 10 to 1000 ppm of a catalyst selected from the group consisting of substituted sulfonic acids, acid phosphate esters of salts thereof, morpholine, magnesium hexafluorsilicate, phosphoric acid and acetic acid subjecting the water containing the overspray paint and catalyst to thermal energy from a heat generating source in order to cure the overspray paint by cross-linking and form cured paint particles which are substantially free of water, and separating said cured paint particles from said water.

2. The method of claim 1 wherein the substituted sulfonic acids are selected from the group consisting of para toluene sulfonic acid, sulfonic acid, trifluoromethane sulfonic acid, methane sulfonic acid and naphthalene sulfonic acid.

3. The method of claim 1 wherein the acid phosphate esters are selected from the group consisting of phenyl acid phosphate, butyl acid phosphate and ethyl acid phosphate.

4. A method for treating a paint spray both water wash system comprising adding to the water from about 10 to 1000 ppm of a photoinitiator selected from the group consisting of sulfonic salts and substituted acetophenones, subjecting the water containing the overspray paint and photoinitiator to curing means selected from the group consisting of electron beam, microwave and ultraviolet energy in order to cure the overspray paint by cross-linking and form cured paint particles which are substantially free of water, and separating said cured paint particles from said water.

5. The method of claim 4 wherein the substituted acetophenones are selected from the group consisting of the alkyl ethers of benzoin, α,α-dimethoxy-α-phenylacetophenone, α-diethoxyacetophenone and benzophenone.

* * * * *